(12) United States Patent
Togashi et al.

(10) Patent No.: US 6,892,025 B2
(45) Date of Patent: May 10, 2005

(54) APPARATUS AND METHOD FOR REPRODUCING PICTURE SIGNAL

(75) Inventors: Motoi Togashi, Sendai (JP); Ryoji Yamaguchi, Katano (JP); Tsutomu Hashimoto, Suita (JP); Ken Monda, Takatsuki (JP); Keiichi Miyazaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 961 days.

(21) Appl. No.: 09/819,203

(22) Filed: Mar. 28, 2001

(65) Prior Publication Data

US 2001/0038747 A1 Nov. 8, 2001

(30) Foreign Application Priority Data

Mar. 31, 2000 (JP) ........................................ 2000-098629

(51) Int. Cl.⁷ .............................. H04N 5/85; H04N 7/26
(52) U.S. Cl. ........................................ 386/125; 386/109
(58) Field of Search ................................ 386/125, 126, 386/124, 109, 112, 27, 33, 105, 106, 45, 40–46; H04N 5/85, 7/26

(56) References Cited

U.S. PATENT DOCUMENTS

| 5,793,431 A | 8/1998 | Blanchard |
| 6,118,927 A * | 9/2000 | Kikuchi et al. ................ 386/95 |
| 6,181,872 B1 * | 1/2001 | Yamane et al. ............. 386/112 |

FOREIGN PATENT DOCUMENTS

| EP | 0696 798 A1 | 2/1996 |
| EP | 0 794 667 A2 | 9/1997 |
| EP | 0 987 895 A2 | 3/2000 |

OTHER PUBLICATIONS

"Vaddis ZR36710—Integrated DVD Decoder" ZORAN, Online!—Oct. 1998 p. 1 XP0022250797. Retrieved from the Internet: <URL:http://www.au.linuxvideo.org/devel/library/zr36710–2.pdf> retrieved on Aug. 7, 2003!.

Rangan P V et al: "Continuity and Synchronization in MPEG", IEEE Journal on Selected Areas in Communications, IEEE Inc. New York, US, vol. 14, NR. 1, pp. 52–60 XP000548810 ISSN: 0733–8716.

* cited by examiner

*Primary Examiner*—Robert Chevalier
(74) *Attorney, Agent, or Firm*—Pearne & Gordon LLP (57) ABSTRACT

A picture signal reproducing apparatus for synchronously reproducing a variety of digital coded data strings, comprises: data transmission controlling unit for inputting a series of digital multiplexed coded data strings including a plurality of packs connected with each other in serial, each of the packs having a SCR, and inserting a reproduction unit switching information at a seamless point between two packs in the series of digital multiplexed coded data strings according to the SCR for each of the packs; and reproduction controlling unit for detecting the seamless point on the basis of the reproduction unit switching information from the series of digital multiplexed coded data strings to synchronously reproduce the variety of digital coded data strings at the detected seamless point.

8 Claims, 7 Drawing Sheets

APPARATUS AND METHOD FOR REPRODUCING PICTURE SIGNAL

BACKGROUND OF THE INVENTION

1. Field of the Invention

The present invention relates to an apparatus for and a method of reproducing a picture signal, and more particularly, to an apparatus for and a method of synchronously reproducing a variety of bit streams, such as audio, video and sub-picture, each having the different system clock reference. The audio, video and sub-picture signals are digital encoded according to a typical coding technology, such as the international standard, ISO-IEC 13818-2, commonly called "MPEG (Moving Picture Expert Group)" and multiplexed to generate a series of digital multiplexed coded bit streams.

2. Description of the Related Art

Recently, a wide variety of digital storage media rapidly become popular. Such digital storage media is typically a mass storage optical memory disk, such as DVD (Digital Versatile Disk) and adapted to record thereon a multiplexed and digital encoded data including a video signal, an audio signal and an additional information signal, such as a subtitle.

In the digital storage media, the video signal is typically encoded according to the MPEG, while the audio signal may be often encoded according to the other standards. The encoded audio and video data may be multiplexed according to a system standard regulated in the MPEG.

Figure 4:
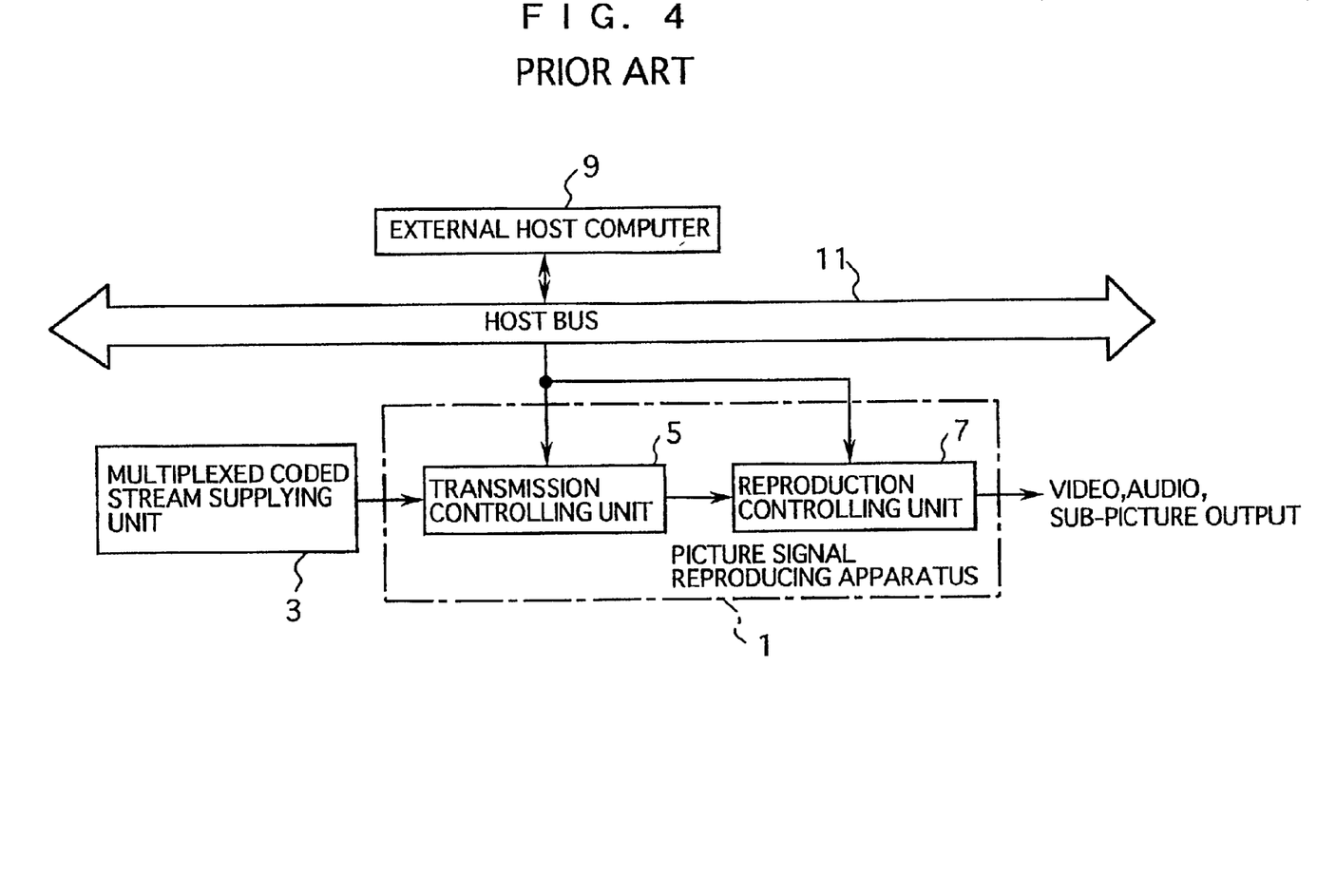
FIG. 4 is a schematic block diagram of an example of the conventional apparatus for reproducing the picture signal.

Referring to FIG. 4 of the drawings, there is shown an example of the conventional DVD system for reproducing the coded data recorded in the DVD as a picture signal reproducing apparatus 1. As shown in FIG. 4, the picture signal reproducing apparatus 1 is connected to a multiplexed coded stream supplying unit 3, such as a DVD disk drive, and comprises a data transmission controlling unit 5 and a reproduction controlling unit 7. The transmission controlling unit 5 is adapted to transmit the coded data recorded in the DVD from the multiplexed coded stream supplying unit 3. The reproduction controlling unit 7 is adapted to decode the transmitted coded data.

The picture signal reproducing apparatus 1 is linked with an external host computer 9 through a host bus 11. The host computer 9 is adapted to control the data transmission controlling unit 5 and the reproduction controlling unit 7. The host computer 9 has a file system for the DVD disk and its management information. In accordance with this management information transmitted from the host computer 9, the data transmission controlling unit 5 is operated to transmit the coded data from the multiplexed coded stream supplying unit 3 to the reproduction controlling unit 7. The reproduction controlling unit 7 is then operated to decode the coded data on the basis of the coded data transmitted from the data transmission controlling unit 5.

Figure 5:
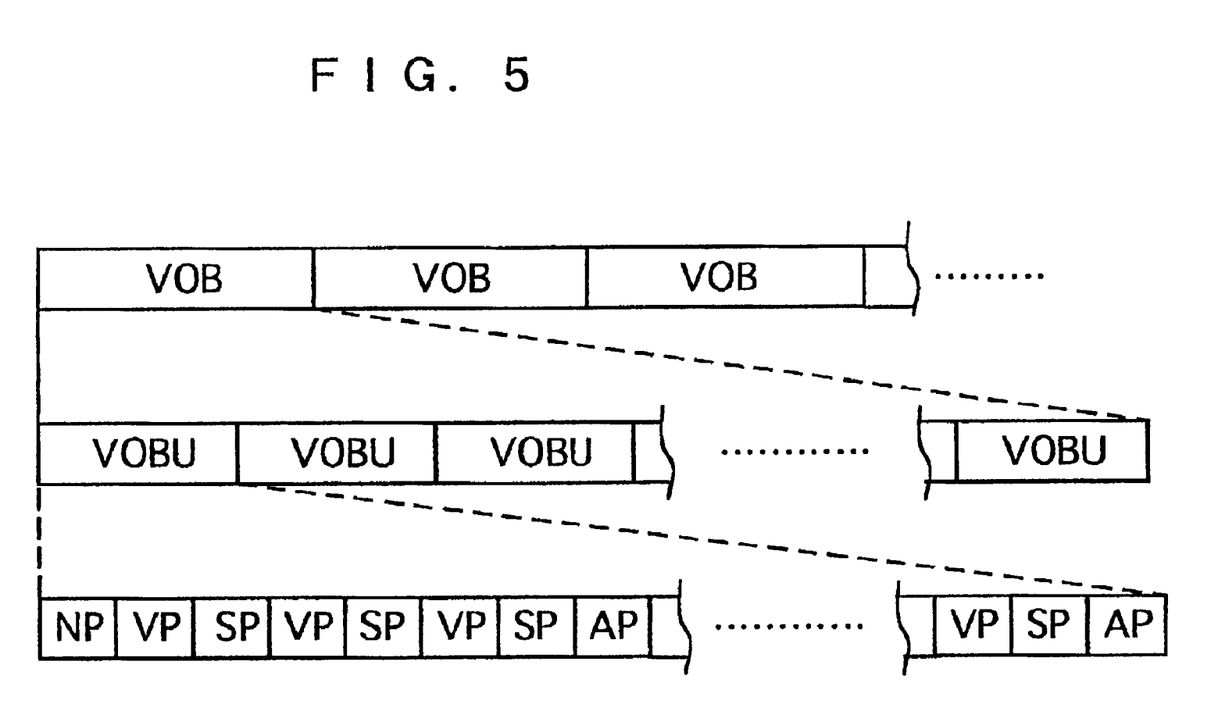
FIG. 5 is a schematic diagram of an example of the structure of pack and packet in the typical multiplexed coded streams according to the DVD video standard.

Referring to FIG. 5 of the drawings, there is shown an example of the structure of the digital multiplexed coded streams according to the DVD video standard in the DVD forum. As shown in FIG. 5, the digital multiplexed coded stream includes at least one video object, referred to as "VOB". Each VOB further includes at least one video object unit, referred to as "VOBU". Each VOBU further includes a first navigation signal NP and a plurality of video signals VP, audio signals AP, and sub-picture signals SP after the navigation signal NP. Each of the audio, video and sub-picture signals is digital encoded by the encoder, not shown, and then multiplexed for each packet by the multiplexing apparatus, not shown. The digital multiplexed coded streams thus has a series of digital coded data strings including a diversity of information as the audio, video, sub-picture, and so on are multiplexed in order.

Figure 6:
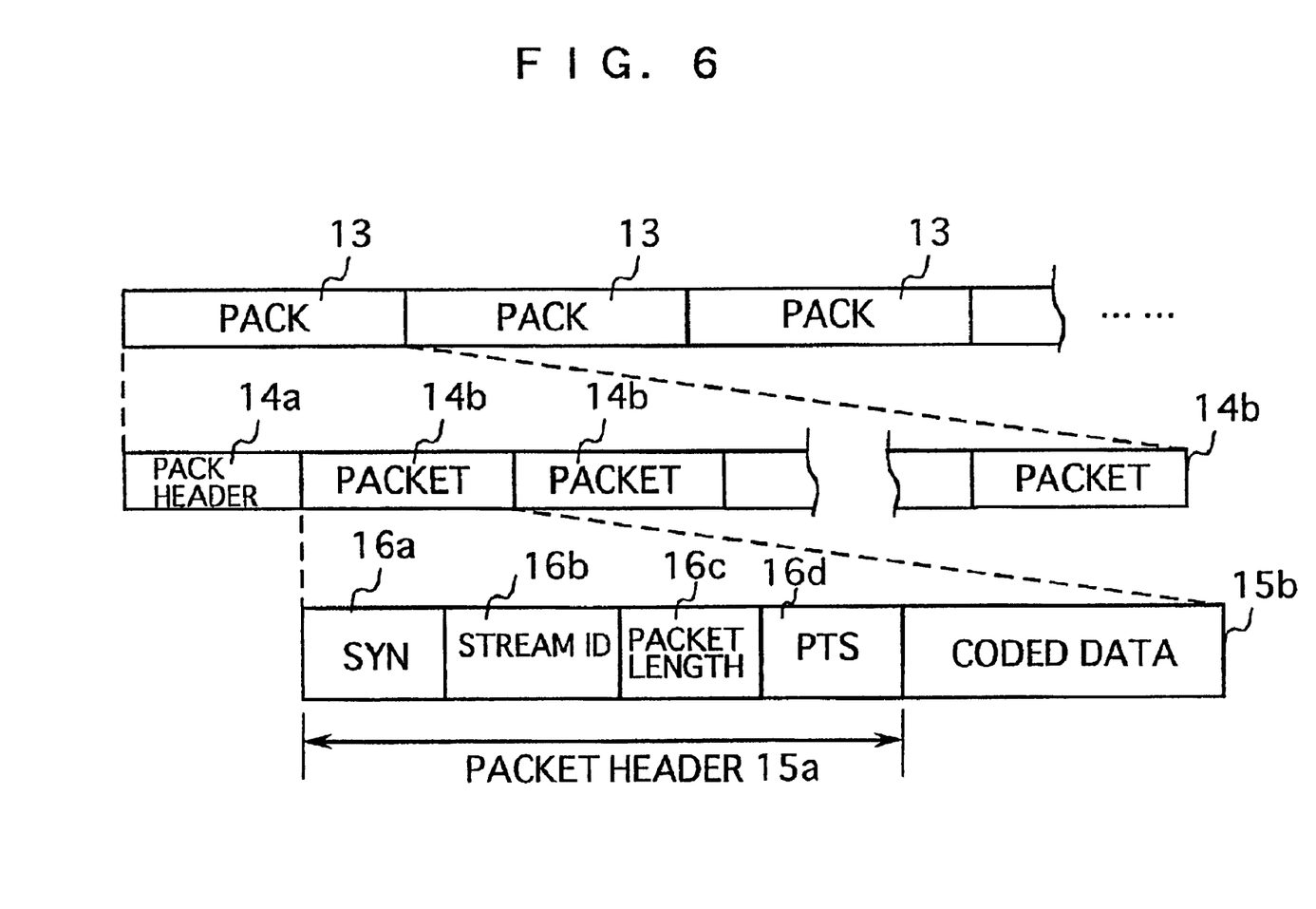
FIG. 6 is a schematic diagram of an example of the structure in the typical multiplexed coded stream.

Referring to FIG. 6 of the drawings, there is shown an example of the structure of pack and packet as an elementary unit in the typical digital multiplexed coded stream. As shown in FIG. 6, the digital multiplexed coded stream has a plurality of packs 13. Each of packs 13 has a first pack header 14a and at least one packet 14b after the pack header 14a. The pack header 14a includes a system clock reference, hereinlater referred to as simply "SCR", having information used for regenerating a system time clock, hereinlater referred to as simply "STC", to decode the multiplexed stream.

Each of packets 14b includes a top packet header 15a and a coded data 15b followed by the packet header 15a. The packet header 15a has a top of synchronous signal 16a, an identifying code 16b, referred to as "stream ID" in the drawings, for identifying a variety of packets, such as video, audio and sub-picture, packet length information 16c, a presentation time stamp 16d, hereinlater referred to as simply "PTS", and so on. The PTS 16d is indicated when each of reproduction units, i.e., each of packs 13 of the video, audio, and sub-picture is decoded in the reference time and when the coded data 15b is reproduced. The coded data 15b is that video, audio and sub-picture information are coded by the coding apparatus, and contained in that packet 14b corresponding to its stream ID 16b.

In such DVD system, the reproduction order and synchronous reproduction of the video, audio and sub-picture are controlled in accordance with the SCR and the PIS. In the forward reproduction, the SCR monotonously increases. The SCR sometimes decreases at a connection point between particular two continuous packs, because of the fact that particular stream for the DVD video recording can be edited and rearranged. The DVD forum works out "DVD Specification for Rewritable/Re-recordable Discs. Part3 VIDEO RECORDING" version 1.0 issued on September, 1999, as a particular standard for achieving the video recording in the rewritable types of DVD, such as a DVD-RAM.

Such connection point between two packs having the different SCR is hereinlater referred to as "seamless point". The seamless point should accurately be detected in order to reset the synchronization of the video, audio and sub-picture at the seamless point.

The host computer 9 can notice the seamless point according to only data stored in the disk. Furthermore, there is another method of detecting the seamless point comprising the steps of: preparing the above information on the seamless point of the host computer 9; decoding the coded stream by the reproduction controlling unit 7 to derive the SCR; and matching the prepared information on the seamless point with the derived SCR to detect the actual seamless point.

Figure 7:
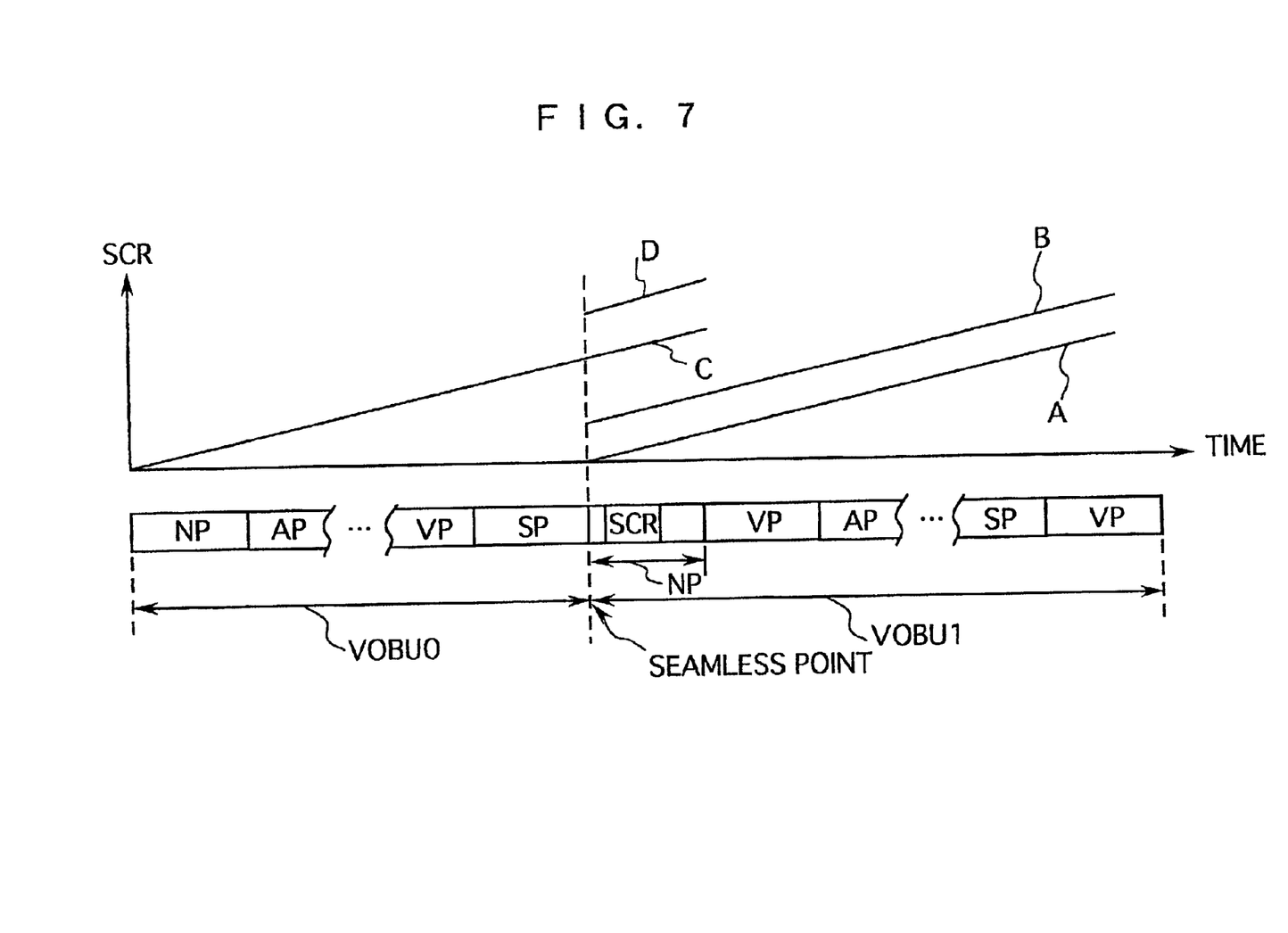
FIG. 7 is a graph showing the characteristics of the variation in the SCR before and after the seamless point.

Referring to FIG. 7 of the drawings, there is shown a graph of an example of the variation in the SCR between two video object units VOBU0 and VOBU1. As shown in FIG. 7, the SCR of the first video object unit VOBU0 gradually increases at first. After the seamless point, the SCR of the next video object unit VOBU1 may be assumed to be four patterns of variation.

In the patterns of variation on the lines A and B in FIG. 7, the SCR falls down at the seamless point and thereafter gradually rises. In the pattern of variation on the line C, the SCR constantly increases before and after the seamless point. In the pattern of variation on the line D, the SCR rises up at the seamless point and thereafter further gradually rises.

In the aforesaid patterns of variation on the lines A and B, the seamless point can be detected on the basis of the SCR contained in the top of the navigation pack NP for each video object unit VOBU. It is however impossible to detect the seamless point on the basis of these SCR in the aforesaid patterns of variation on the lines C and D. The above variations in the SCR on the lines C and D may occur when the streams are edited and rearranged.

In Japanese Non-examines Patent Publication No. H10-26221 there is disclosed a typical method of reproducing the picture signal on the basis of the seamless point detected according to the SCR in which the picture signal reproducing apparatus may be controlled in accordance with the difference between the last SCR of the former pack and the top SCR of the latter pack. This method may be constructed on the assumption that the top SCR of the latter pack should be smaller than the last SCR of the former pack. For this reason, the seamless point cannot be detected in case of the aforesaid pattern of variation in the SCR on the line D.

According to the DVD Specification for Rewritable/Rerecordable Discs. Part3 VIDEO RECORDING, it is assumed that the last SCR of the pack before the seamless point and the top SCR of the pack after the seamless point may be defined as management information and the seamless point may be detected on the basis of predetermined system clock references for both of the aforesaid packs in the picture signal reproducing apparatus.

The above conventional picture signal reproducing apparatus 1, however, should be operated to transmit the information on the SCR monitored by the host computer 9 for each reproduction unit to the picture signal reproducing apparatus 1 when the stream is transmitted from a prior input buffer, such as the multiplexed coded stream supplying unit 3, to the picture signal reproducing apparatus 1. This process is troublesome in the management.

SUMMARY OF THE INVENTION

It is therefore an object of the present invention to provide a picture signal reproducing apparatus for synchronously reproducing a variety of digital coded data strings having a plurality of reproduction units connected in serial which it is possible to detect a connection point between the reproduction units without fail.

It is another object of the present invention to provide a picture signal reproducing method of synchronously reproducing a variety of digital coded data strings having a plurality of reproduction units connected in serial which it is possible to detect a connection point between the reproduction units without fail.

In accordance with a first aspect of the present invention, there is provided a picture signal reproducing apparatus for synchronously reproducing a variety of digital coded data strings, comprising: data transmission controlling means for inputting a series of digital multiplexed coded data strings including a plurality of reproduction units connected with each other in serial, each of the reproduction units having a system clock reference, and inserting a reproduction unit switching information at a connection point between two reproduction units in the series of digital multiplexed coded data strings according to the system clock reference for each of the reproduction units; and reproducing means for detecting the connection point on the basis of the reproduction unit switching information from the series of digital multiplexed coded data strings to synchronously reproduce the variety of digital coded data strings at the detected connection point.

Here, the above variety of digital coded data strings means each of packets which is generated by the encoding apparatus by encoding audio, video, sub-picture and so on. The each of packets, such of audio, video and sub-picture packets, has different reproduction clocks. A plurality of the packets gather together into a reproduction unit, a pack, having a system clock reference for synchronizing variety of packets one another. The packs are connected with each other to obtain a series of digital multiplexed coded data strings, i.e., multiplexed coded streams. The reproduction unit switching information is contained in a seamless packet and inserted into the seamless point of the multiplexed coded streams.

In the aforesaid apparatus, the data transmission controlling means may have: a connection point detecting unit for detecting the connection point between the reproduction units; a switching information producing unit for producing the reproduction unit switching information; and a switching information inserting unit for inserting the reproduction unit switching information at the connection point between the reproduction units in the series of digital multiplexed coded data strings.

In the aforesaid apparatus, each of the reproduction units may have a header including the reproduction unit switching information. Furthermore, the reproducing means may have: a header analyzing unit for analyzing to detect the connection point between the reproduction units on the basis of the reproduction unit switching information; and a decoding unit for decoding the series of digital multiplexed coded data strings to synchronously reproduce the variety of the digital coded data strings according to the detected reproduction unit switching information.

In the aforesaid apparatus, the reproduction unit switching information produced by the switching information producing unit of the data transmission controlling means may include a first system clock reference of the reproduction unit just before the connection point and a second system clock reference of the reproduction unit just after the connection point.

In the aforesaid apparatus, said reproduction unit switching information produced by said switching information producing unit of said data transmission controlling means may include an identifying code, and said header analyzing unit of said reproducing means being operated to analyze said identifying code to detect said switching information.

In accordance with a second aspect of the present invention, there is provided a picture signal reproducing method of synchronously reproducing a variety of digital coded data strings, comprising the steps of:

(a) inputting a series of digital multiplexed coded data strings including a plurality of reproduction units connected with each other in serial, each of the reproduction units having a system clock reference;

(b) inserting a reproduction unit switching information at a connection point between two reproduction units in the series of digital multiplexed coded data strings according to the system clock reference for each of the reproduction units;

(c) detecting the connection point on the basis of the reproduction unit switching information from the series of digital multiplexed coded data strings; and (d) synchronously reproducing the variety of digital coded data strings at the detected connection point.

In the aforesaid method, the reproduction unit switching information may include a first system clock reference of the reproduction unit just before the connection point and a second system clock reference of the reproduction unit just after the connection point.

In the aforesaid method, the reproduction unit switching information produced in the step (b) may include an identifying code, and the step (c) having the step of analyzing the identifying code to detect the switching information.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Throughout the following detailed description, similar reference characters refer to similar elements in all figures of the drawings.

Figure 1:
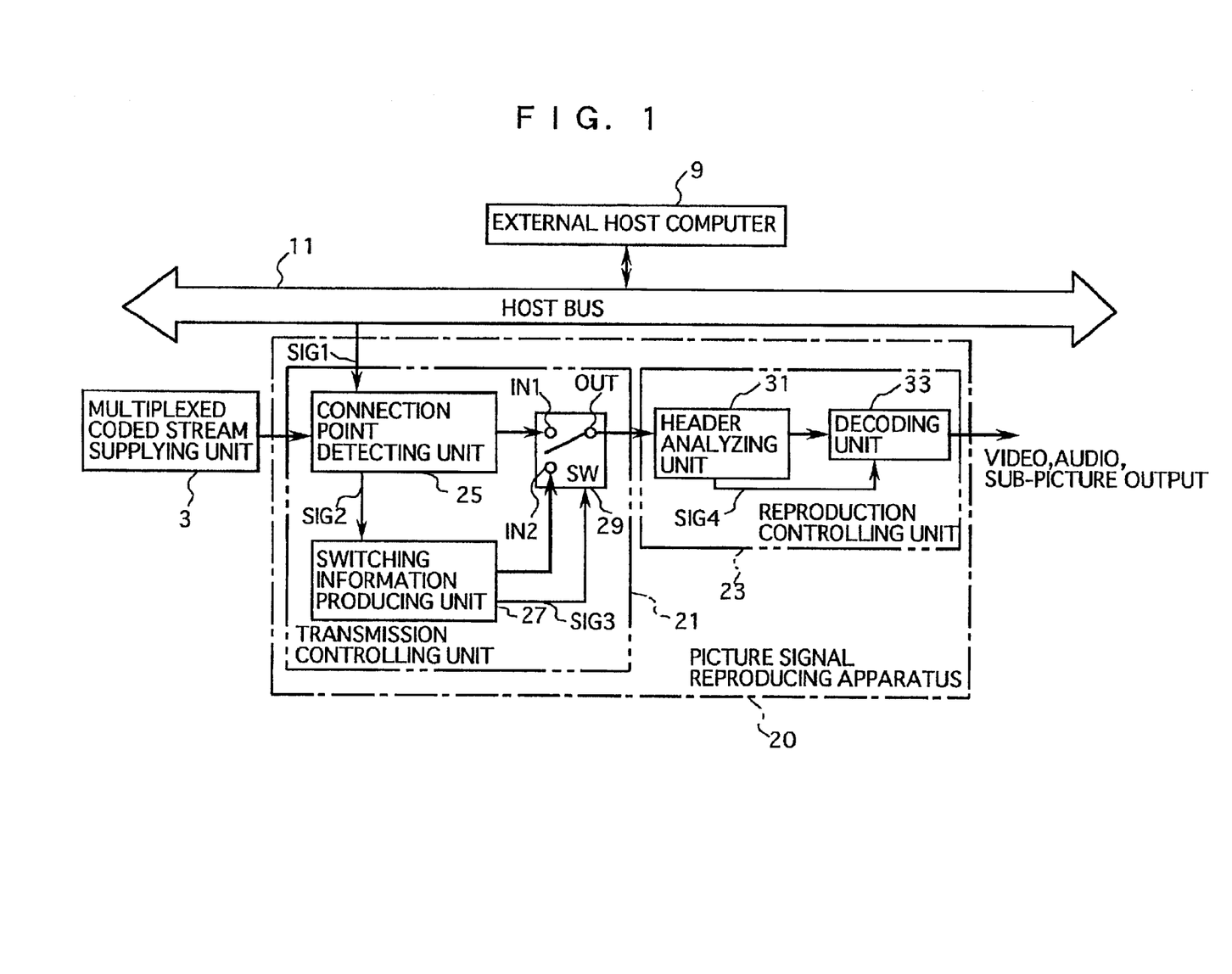
FIG. 1 is a schematic block diagram of a preferred embodiment of the picture signal reproducing apparatus according to the present invention.

Referring now to FIG. 1 of the drawings, there is shown a preferred embodiment of the picture signal reproducing apparatus 20 according to the present invention. As shown in FIG. 1, the picture signal reproducing apparatus 20 is linked with an external hose computer 9 through a host bus 11, and comprises a transmission controlling unit 21 and a reproduction controlling unit 23. The picture signal reproducing apparatus 20 is also connected to a multiplexed coded stream supplying unit 3. The picture signal reproducing apparatus 20 thus constructed is designed to input, through the multiplexed coded stream supplying unit 3, a bit stream which is previously obtained by digital encoding video, audio, sub-picture signals and so on, and multiplexing the digital encoded signals for each packet unit, and to then synchronously reproduce the video, audio and sub-picture signals with one another.

The data transmission controlling unit 21 includes a connection point detecting unit 25, a switching information producing unit 27 and a switch 29. The data transmission controlling unit 21 is adapted to insert a seamless packet at the seamless point in the multiplexed bit streams.

The connection point detecting unit 25 is connected to the host computer 9 through the host bus 11 and designed to input a first signal SIG1 from the host computer 9 through the host bus 11. The first signal SIG includes reproduction unit management information. The connection point detecting unit 25 is further designed to derive the reproduction unit management information from the first signal SIG1 and then to detect a seamless point on the basis of the derived reproduction unit management information. The above reproduction unit management information including information on the system clock reference for each reproduction unit can be obtained by the hose computer 9 on the basis of the information contained in the navigation information in the multiplexed coded streams. The reproduction unit management information, hereinlater referred to as "seamless point information", includes a system clock reference of the reproduction unit just before the seamless point and a system clock reference of the reproduction unit just after the seamless point.

The connection point detecting unit 25 is further connected to the multiplexed coded stream supplying unit 3 and designed to input the streams from the multiplexed coded stream supplying unit 3 and then to analyze the inputted streams to detect the seamless point. According to the analysis result, the connection point detecting unit 25 is operated to perform a normal process for the packets just before the seamless point. On the other hand, the connection point detecting unit 25 is operated to output the second signal SIG 2 including the seamless point information to the switching information producing unit 27 in response to the detection of the seamless point.

The switching information producing unit 27 is connected to the connection point detecting unit 25 and designed to input a second signal SIG2 including the seamless point information from the connection point detecting unit 25. In response to the input of the second signal SIG2, the switching information producing unit 27 is activated. After the activation, the switching information producing unit 27 is further designed to produce reproduction unit switching information on the basis of the seamless point information, i.e., a seamless packet, and to then output the produced seamless packet and a third signal SIG3 to the switch 29. In response to this third signal SIG3, the switch 29 is operated to select the seamless packet transmitted from the switching information producing unit 27 to be transmitted to the reproduction controlling unit 23. Therefore, the seamless packet can be inserted at the seamless point in the multiplexed coded streams.

The switch 29 has a first and second input terminals IN1 and IN2 and an output terminal OUT. The switch 29 is connected to the connection point detecting unit 25 through the first input terminal IN1 and connected to the switching information producing unit 27 through the second input terminal IN2.

The switch 29 is designed to input the streams from the connection point detecting unit 25 and input the seamless packet and the third signal SIG3 from the switching information producing unit 27 and then select either one of the streams or the seamless packet to be outputted through the output terminal OUT in accordance with the third signal SIG3. More specifically, in response to the input of the third signal SIG3, the switch 29 is operated to select the seamless packet inputted through the second input terminal IN2 to be outputted through the output terminal OUT. On the other hand, when the third signal SIG3 is not inputted, i.e., in the normal mode, the switch 29 is operated to select the streams inputted through the first input terminal IN1 to be outputted through the output terminal OUT. The operation of the switch 29 thus achieves the insertion of the seamless packet at the seamless point in the multiplexed coded streams.

The reproduction controlling unit 23 includes a header analyzing unit 31 and a decoding unit 33 as shown in FIG. 1 and is designed to detect the seamless packet from the streams transmitted from the transmission controlling unit 21 to determine the seamless point in the multiplexed coded streams and then to decode the multiplexed coded streams.

The header analyzing unit 31 is connected to the switch 29 of the transmission controlling unit 21 and designed to input the multiplexed coded streams including the seamless packet to analyze the header in each packet in the inputted streams and then to output a coded data and a fourth signal SIG4 having analysis result information on the results of the analysis of the header.

The decoding unit 33 is connected to the header analyzing unit 31 and designed to input the coded data and the fourth signal SIG4 from the header analyzing unit 31 to reproduce the inputted coded data on the basis of the analysis result information in the inputted fourth signal SIG4 and then to output the video, audio and sub-picture to outside.

Figure 2:
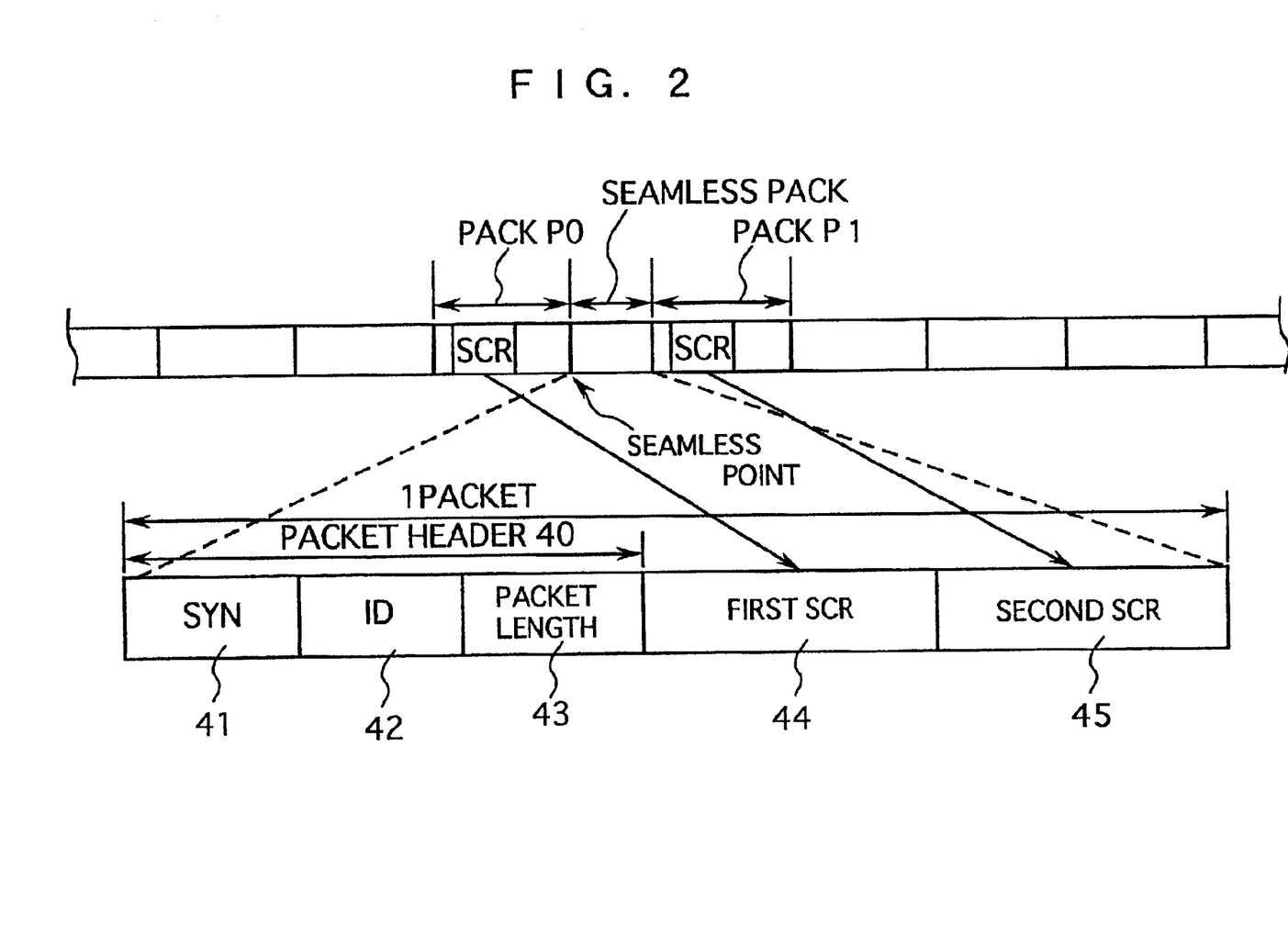
FIG. 2 is a schematic diagram of an example of the structure of the seamless packet inserted by the picture signal reproducing apparatus shown in FIG. 1.

Referring to FIG. 2 of the drawings, there is shown an example of the structure and the insertion position of the seamless packet generated by the switching information producing unit 27 in this embodiment. In this embodiment, the seamless packet includes a packet header 40 having a synchronous signal 41, an identifying code 42, and a packet length signal 43, first and second system clock reference signals 44 and 45 after the packet header 40.

The identifying code 42 is the streams ID and used for the judgment of the seamless packet. In this embodiment, the streams ID contained in the seamless packet may be previously assigned to any IDs except for the streams ID used for the normal streams conformable to the DVD. The first system clock reference signal 44 is the SCR of the pack P0 just before the seamless point, while the second system clock reference signal 45 is the SCR of the pack P1 just after the seamless point. Both of the first and second system clock reference signals 44 and 45 are obtained from the seamless point information in the second signal SIG2. The first and second system clock reference signals 44 and 45 are used for preventing a failure in detecting the seamless packet when an error occurs in the streams. The error in the streams can be therefore detected by comparing the SCR of the pack P0 before the seamless point with the SCR of the pack P1 after the seamless point.

Figure 3:
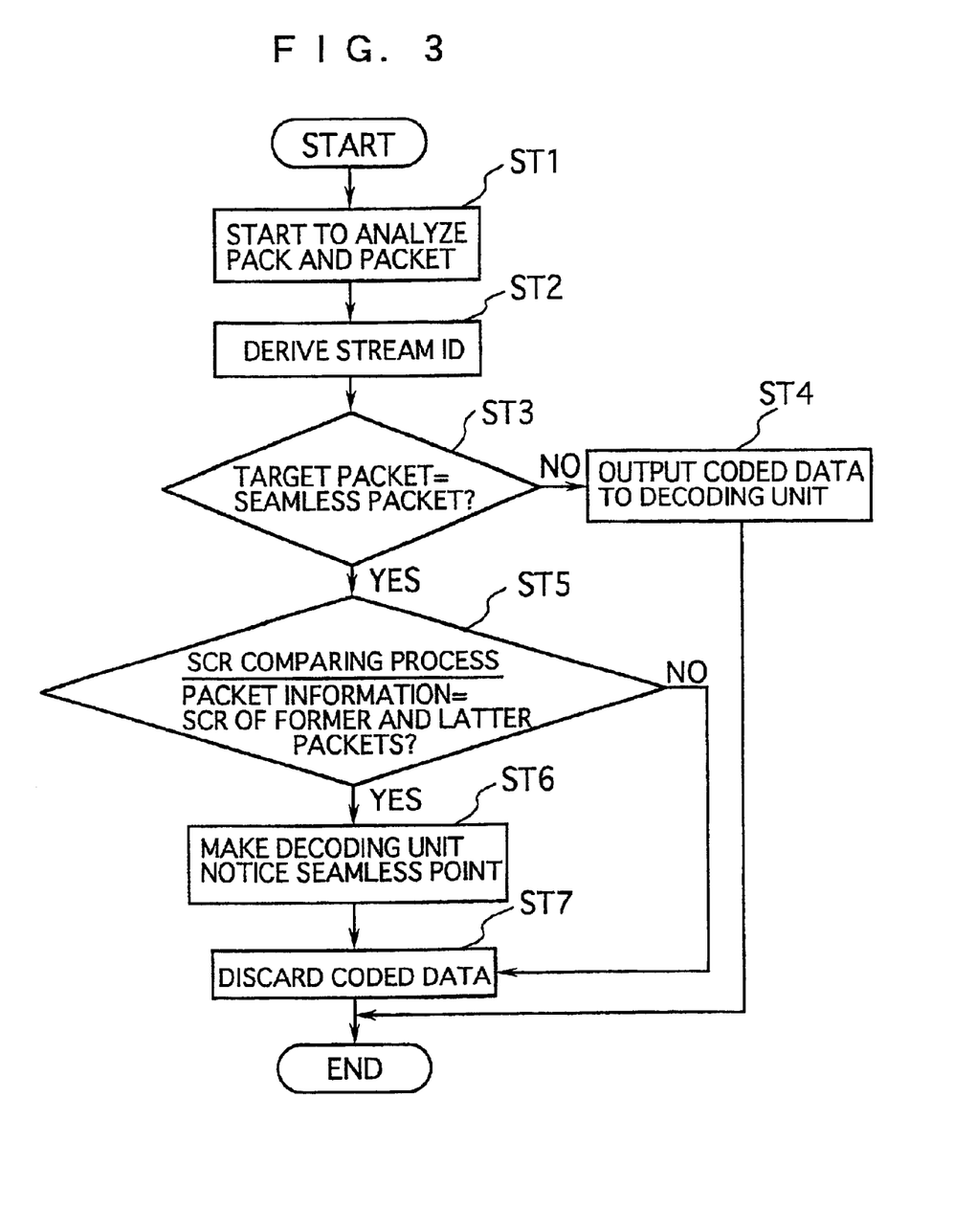
FIG. 3 is a flowchart showing an example of the flow of the seamless point detecting process in the header analyzing unit of the picture signal reproducing apparatus as shown in FIG. 1.

Referring now to FIG. 3 of the drawings, there is shown a flowchart of the flow of a process of detecting the seamless point in the header analyzing unit 31 of the picture signal reproducing apparatus 20 according to the present invention. As shown in FIG. 3, the seamless point detecting process comprises steps ST1 to ST7.

In the step ST1, the header analyzing unit 31 is operated to start to analyze the pack and the packet in response to the detections of the pack header and the packet header, respectively. In the following step ST2, the header analyzing unit 31 is operated to derive the stream ID from the packet header. In the step ST3, the header analyzing unit 31 is then operated to judge whether the obtained stream ID is indicative of the seamless packet or not. When the stream ID is indicative of the seamless packet, the analyzed target packet is judged to be the seamless packet. The step ST3 then goes to the step ST5. When the obtained stream ID is indicative of any one except for the seamless packet, the analyzed target packet is judged to the packets of the video, audio and sub-picture, and then the step ST3 goes to the step ST4. In the step ST4, the coded data in the target packet is judged to be effective and therefore transmitted to the decoding unit 33, while this process is then terminated.

On the other hand, even when the judgment in the step ST3 is made that the stream ID in the target packet is indicative of the seamless packet, the stream ID sometime becomes unexpectedly the same stream ID of the seamless packet due to an error in the streams. The judgment process in the following step ST5 can prevent such unfortunate mistake in the detection of the seamless packet.

In the step ST5, the internal information in the packet identified as the seamless packet in the step ST3 is compared with the SCR of the packet P0 before the seamless packet and the SCR of the packet P1 after the seamless packet. In this case, the seamless packet may have an internal structure as shown in FIG. 2. When the first system clock reference signal 44 is identical with the SCR of the packet P0 before the seamless packet and when the second system clock reference signal 45 is also identical with the SCR of the packet P1 after the seamless packet, the target packet is defined as the seamless packet. When, on the contrary, either one of the first and second system clock reference signals 44 and 45 is different from the corresponding SCR, the target packet is assumed to make an error. In this case, the header analyzing unit 31 is operated to derive no seamless point. The step ST5 then goes to the step ST7.

In the step ST6, the header analyzing unit 31 is operated to output the fourth signal SIG4 including the analysis result information according to the results made in the steps ST3 and ST5 to the decoding unit 33 in order to make the decoding unit 33 notice that the target packet is defined as the seamless point. In the step ST7, the coded data corresponding to the target packet is discarded.

The steps ST1 to ST7 in the above process can be repeated for the whole multiplexed encoded streams sequentially.

The seamless point detecting process thus constructed can built a relationship between the seamless point and the SCR, thereby making it possible to exactly detect the seamless point.

The operation of the picture signal reproducing apparatus 20 of this embodiment will the described hereinlater in detail.

Firstly, all processes except for the seamless point detecting process will be described.

The switch 29 of the transmission controlling unit 21 is usually operated to select the first input terminal IN1 to transmit the multiplexed coded streams from the multiplexed coded stream supplying unit 3 through the connection point detecting unit 25 of the transmission controlling unit 21 to the header analyzing unit 31 of the reproduction controlling unit 23 therethrough. The header analyzing unit 31 of the reproduction controlling unit 23 is then operated according to the steps in the header analyzing process shown in FIG. 3.

Firstly, in the step ST1, the multiplexed coded streams transmitted from the transmission controlling unit 21 is analyzed by the header analyzing unit 31 to derive the pack header and the packet header from the transmitted multiplexed coded streams. The step ST1 proceeds to the next step ST2, wherein the stream ID is derived from the obtained packet header. In the following step ST3, the judgment is made whether the obtained stream ID is indicative of the seamless packet or not. In the case where the obtained stream ID is not indicative of the seamless packet, the step ST3 proceeds to the step ST4, wherein the fourth signal SIG4 including the coded data and the analysis result information are transmitted to the reproduction controlling unit 23.

In the decoding unit 33 of the reproduction controlling unit 23, the transmitted coded data is reproduced on the basis of the transmitted analysis result information to then output the video, audio and sub-picture to outside.

Next, the seamless point detecting process will be described hereinlater.

The seamless point is detected by the connection point detecting unit 25 on the basis of the seamless point information of the reproduction unit management information contained in the first signal SIG1 inputted from the host computer 9 through the host bus 11.

In the response to the detection of the seamless point in the connection point detecting unit 25, the seamless point information is contained in the second signal SIG2 and then transmitted to the switching information producing unit 27.

In response to the second signal SIG2 including the seamless point information inputted from the connection point detecting unit 25, the switching information producing unit 27 is activated. The switching information producing unit 27 is then operated to control the switch 29 in accordance with the third signal SIG3 and to generate the seamless packet on the basis of the seamless point information. The generated seamless packet is then outputted to the switch 29 from the switching information producing unit 27. The switch 29 is then operated to select the second input terminal IN2 to input the seamless packet from the switching information producing unit 27 therethrough in response to the third signal SIG3. As a result, the seamless packet is transmitted to the header analyzing unit 31 of the reproduction controlling unit 23.

The switching information producing unit 27 is thereafter operated to output the third signal SIG3 to the switch 29 thereby making the switch 29 select the first input terminal IN1.

The seamless packet can be therefore inserted at the seamless point in the multiplexed coded streams. The multiplexed coded streams including the seamless packet thus obtained is then processed by the header analyzing unit 31 of the reproduction controlling unit 23 according to the steps in the seamless point detecting process shown in FIG. 3.

Firstly, in the step ST1, the multiplexed coded streams transmitted from the transmission controlling unit 21 is analyzed by the header analyzing unit 31 of the reproduction controlling unit 23 to derive the pack header and the packet header from the transmitted multiplexed coded streams. The step ST1 proceeds to the next step ST2, wherein the stream ID is derived from the obtained packet header.

In the following step ST3, the judgment is made whether the detected stream ID is indicative of the seamless packet or not. In this case, the stream ID is indicative of the seamless packet, the step ST3 proceeds to the step ST5, wherein the internal information in the packet identified as the seamless packet in the step ST3 is compared with both of the SCR of the packet P0 before the seamless packet and the SCR of the packet P1 after the seamless packet. More specifically, the judgment is made whether the first system clock reference signal 44 is identical with the SCR of the packet P0 before the seamless packet or not, and the judgment is also made whether the second system clock reference signal 45 is also identical with the SCR of the packet P1 after the seamless packet or not. When both signals are respectively identical with the corresponding SCRS, the step ST5 goes to the step ST6 wherein the target packet is definitely defined as the seamless packet. Furthermore, the fourth signal SIG4 is then outputted from the header analyzing unit 31 of the reproduction controlling unit 23 to make the decoding unit 33 of the header analyzing unit 31 notice the seamless point. In the following step ST7, the coded data in the seamless packet is discarded.

When, on the other hand, the judgment in the aforesaid step ST5 that the target packet is not identified as the seamless packet, the step ST6 is bypassed and the step ST5 proceeds to the step ST7 wherein the coded data in the target packet is also discarded.

In the decoding unit 33 of the reproduction controlling unit 23, the video, audio and sub-picture can be therefore synchronously reproduced at the seamless point on the basis of the fourth signal SIG4 according to the analysis result in the analyzing unit 33.

It will be understood from the foregoing description that the picture signal reproducing apparatus according to the present invention in which the information is transmitted from the external host computer and inserted into the streams, and the seamless point is detected according to this information for reproduction, thereby making it possible to exactly detect the seamless even when the SCR does not fall down at the seamless point as well as even when an error occurs in the streams.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A picture signal reproducing apparatus for synchronously reproducing a variety of digital coded data strings, comprising:
    data transmission controlling means for inputting a series of digital multiplexed coded data strings including a plurality of reproduction units connected with each other in serial, each of said reproduction units having a system clock reference, and inserting a reproduction unit switching information at a connection point between two reproduction units in said series of digital multiplexed coded data strings according to said system clock reference for each of said reproduction units; and
    reproducing means for detecting said connection point on the basis of said reproduction unit switching information from said series of digital multiplexed coded data strings to synchronously reproduce said variety of digital coded data strings at the detected connection point.

2. The picture signal reproducing apparatus as set forth in claim 1, wherein said data transmission controlling means has:
    a connection point detecting unit for detecting said connection point between said reproduction units;
    a switching information producing unit for producing said reproduction unit switching information; and
    a switching information inserting unit for inserting said reproduction unit switching information at said connection point between said reproduction units in said series of digital multiplexed coded data strings.

3. The picture signal reproducing apparatus as set forth in claim 1, wherein each of said reproduction units has a header including said reproduction unit switching information, and said reproducing means having:
    a header analyzing unit for analyzing to detect said connection point between said reproduction units on the basis of said reproduction unit switching information; and
    a decoding unit for decoding said series of digital multiplexed coded data strings to synchronously reproduce said variety of said digital coded data strings according to the detected reproduction unit switching information.

4. The picture signal reproducing apparatus as set forth in claim 1, wherein said reproduction unit switching information produced by said switching information producing unit of said data transmission controlling means includes a first system clock reference of said reproduction unit just before said connection point and a second system clock reference of said reproduction unit just after said connection point.

5. The picture signal reproducing apparatus as set forth in claim 1, wherein said reproduction unit switching information produced by said switching information producing unit of said data transmission controlling means includes an identifying code, and said header analyzing unit of said reproducing means being operated to analyze said identifying code to detect said switching information.

6. A picture signal reproducing method of synchronously reproducing a variety of digital coded data strings, comprising the steps of:

(a) inputting a series of digital multiplexed coded data strings including a plurality of reproduction units connected with each other in serial, each of said reproduction units having a system clock reference;

(e) inserting a reproduction unit switching information at a connection point between two reproduction units in said series of digital multiplexed coded data strings according to said system clock reference for each of said reproduction units;

(f) detecting said connection point on the basis of said reproduction unit switching information from said series of digital multiplexed coded data strings; and (g) synchronously reproducing said variety of digital coded data strings at the detected connection point.

7. The picture signal reproducing method as set forth in claim 6, wherein said reproduction unit switching information includes a first system clock reference of said reproduction unit just before said connection point and a second system clock reference of said reproduction unit just after said connection point.

8. The picture signal reproducing method as set forth in claim 6, wherein said reproduction unit switching information produced in said step (b) includes an identifying code, and said step (c) having the step of analyzing said identifying code to detect said switching information.

* * * * *